Patented Jan. 12, 1937

2,067,494

UNITED STATES PATENT OFFICE 2,067,494

DITHIOCARBAMATES

Joy G. Lichty, Akron, Ohio, assignor to Wingfoot Corporation, Wilmington, Del., a corporation of Delaware No Drawing. Application April 5, 1932, Serial No. 603,454

7 Claims. (Cl. 260—99.11)

This invention relates to the vulcanization of rubber. More particularly, it relates to a method of accelerating the processes of vulcanization by incorporating in the unvulcanized stock certain chemical compounds which not only are comparatively easy to prepare but also impart desirable physical properties to the vulcanized product. The compounds with which the invention deals may be described as derivatives of the dithiocarbamic acids.

The following type formula illustrates the compounds which the invention concerns:

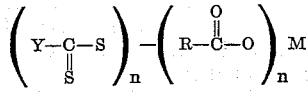

In this formula, Y represents either the group

(R' and R'' being alkyl, aryl, or aralkyl radicals) or a heterocyclic radical such as

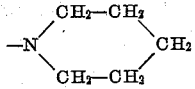

The letter $n$ represents one or more, R stands for carbon or carbon and hydrogen, and M represents hydrogen, a metal, an alkyl, aryl or aralkyl radical, or a salt-forming radical such as the ammonium and substituted ammonium groups, of which the following are examples:

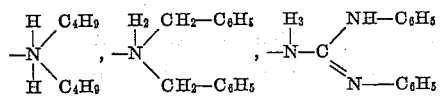

As illustrating the preparation of these compounds there may be mentioned the preparation of carboxy-methyl di(dimethyl dithiocarbamate). In preparing this material, an aqueous solution containing ¼ mol. of ammonium dichloroacetate and ½ mol. of sodium dimethyl dithiocarbamate is heated on a water bath at 50 degrees C. for ¾ of an hour, after which it is cooled with ice and acidified with hydrochloric acid. The solid is removed by filtration and the aqueous solution extracted with a diethyl ether. The total yield approximates 72%, the material being obtained in the form of a solid which decomposes on melting. The reactions may be expressed as follows:

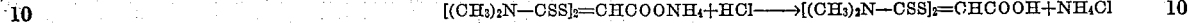

In the preparation of carboxy methyl di(diethyl dithiocarbamate), an aqueous solution containing ½ mol. of sodium diethyl dithiocarbamate and ¼ mol. of ammonium dichloroacetate is heated at 50 degrees C. on a water bath for 1¾ hours. It is then chilled with ice and acidified with hydrochloric acid, giving a dark-colored oil. The oil is removed by means of a separatory funnel, after which the carbamate is extracted with diethyl ether from the aqueous layer. The total yield of the dry product is in the neighborhood of 64%.

For the preparation of carboxy methyl di(pentamethylene dithiocarbamate), an aqueous solution containing ¼ mol. of ammonium dichloroacetate and ½ mol. of sodium pentamethylene dithiocarbamate is heated on a steam bath for a short time, much hydrogen sulfide being liberated in the meanwhile. The liquid is acidified with hydrochloric acid. There results a light brown solid which decomposes on melting. The reactions for this preparation may be expressed as follows:

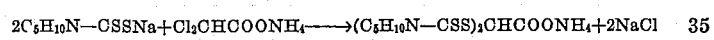

For the preparation of carbethoxy methyl di(diethyl dithiocarbamate), a mixture containing 39.3 grams (¼ mol.) of ethyl dichloroacetate, 444 grams of an aqueous solution containing ½ mol. of sodium diethyl dithiocarbamate, and 200 cc. of acetone may be refluxed on a steam bath for two hours, after which the acetone is removed by distillation. The lower layer of liquid may be separated by means of a separatory funnel and dried in a vacuum desiccator. The yield is approximately 77%. The reactions involved are as follows:

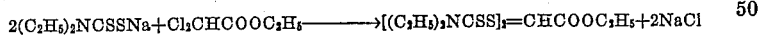

In the preparation of carbethoxy methyl di(dimethyl dithiocarbamate) a mixture containing ¼ mol. of ethyl dichloroacetate, ½ mol. of sodium dimethyl-dithiocarbamate in aqueous solution and 200 cc. acetone is refluxed for one half hour. The product is cooled and the solid removed by filtration. The yield is about 66%. When recrystallized from a solution of chloroform and alcohol, the product melts at 178 degrees C. The reactions are as follows:

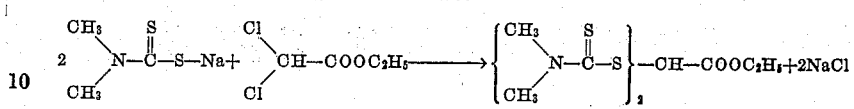

In the preparation of the diphenylguanidine salt of carboxy methyl di(dimethyl dithiocarbamate), a mixture of 14.9 grams of carboxy methyl di(dimethyl dithiocarbamate) and 10.6 grams of diphenylguanidine are dissolved in 55 cc. of alcohol. The solvent is removed by long standing in the open, finally allowing the mixture to remain over calcium chloride in a vacuum desiccator for 48 hours. The yield is quantitative. The reaction proceeds as follows:

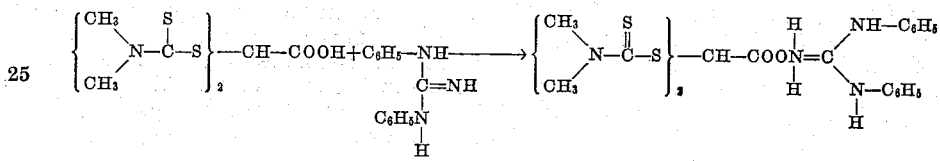

These compounds were tested as accelerators of vulcanization by incorporating them into a rubber composition of the following formula:

| | Parts |
|---|---|
| Rubber (extracted pale crepe) | 100.0 |
| Zinc oxide | 5.0 |
| Sulfur | 3.0 |
| Stearic acid | 1.5 |
| Accelerator | .5 |

After vulcanization, physical tests were run with results indicated.

| Cure | | Tensile | Elong. | Stress kgs/cm² at | |
|---|---|---|---|---|---|
| Time in Mins. | Temp. F.° | | | 500% elong. | 700% elong. |

*Carboxy methyl di(dimethyl dithiocarbamate)*

| 10 | 260 | 142 | 770 | 24 | 94 |
| 15 | 260 | 177 | 725 | 35 | 152 |
| 20 | 260 | 202 | 705 | 46 | 195 |
| 30 | 260 | 177 | 685 | 45 | |
| 40 | 260 | 163 | 695 | 39 | |

*Carboxy methyl di(diethyl dithiocarbamate)*

| 10 | 260 | 98 | 895 | 13 | 33 |
| 15 | 260 | 119 | 865 | 14 | 47 |
| 20 | 260 | 141 | 805 | 21 | 75 |
| 35 | 260 | 116 | 675 | 34 | |

*Carboxy methyl di(pentamethylene dithiocarbamate)*

| 15 | 260 | 73 | 905 | 11 | 25 |
| 20 | 260 | 101 | 860 | 15 | 41 |
| 35 | 260 | 129 | 805 | 20 | 68 |
| 50 | 260 | 145 | 780 | 25 | 90 |

*Carbethoxy methyl di(diethyl dithiocarbamate)*

| 20 | 260 | 75 | 900 | 11 | 26 |
| 25 | 260 | 104 | 845 | 15 | 43 |
| 40 | 260 | 148 | 775 | 25 | 94 |
| 60 | 260 | 185 | 760 | 32 | 126 |

*Carbethoxy methyl di(dimethyl dithiocarbamate)*

| 15 | 260 | 52 | 875 | 8 | 20 |
| 20 | 260 | 108 | 845 | 15 | 45 |
| 30 | 260 | 156 | 780 | 24 | 95 |
| 40 | 260 | 172 | 720 | 38 | 154 |

*Diphenylguanidine salt of carboxy methyl di(dimethyl dithiocarbamate)*

| 5 | 260 | 114 | 885 | 12 | 31 |
| 10 | 260 | 182 | 755 | 28 | 125 |
| 15 | 260 | 197 | 715 | 40 | 183 |
| 20 | 260 | 202 | 680 | 52 | |

These compounds, which are new in themselves, possess valuable properties as accelerators of vulcanization. It will be understood that the specifically described details of the invention as herein given may be varied within comparatively wide limits without departing from the inventive concept and that it is desired to embrace within the scope of this invention such modifications and changes as may be necessary to adapt it to varying conditions and uses. It is intended that the patent shall cover, by suitable expression in the appended claims, whatever features of patentable novelty reside in the invention.

What is claimed is:

1. Carboxy methyl di(dimethyl dithiocarbamate).

2. A compound having the formula

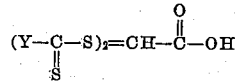

wherein Y is a tertiary aliphatic amino group.

3. A compound having the formula

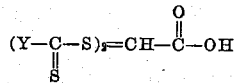

wherein Y is an aliphatic amino group.

4. A compound having the formula

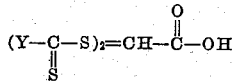

wherein Y is a dialkyl amino group.

5. Ammonium carboxy methyl di(dimethyl dithiocarbamate).

6. A compound having the formula

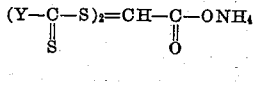

wherein Y is a tertiary aliphatic amino group.

7. The compounds having the formula

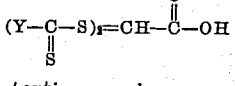

wherein Y is a tertiary amino group.

JOY G. LICHTY.